United States Patent [19]

Kazlauskas

[11] Patent Number: 4,476,367

[45] Date of Patent: Oct. 9, 1984

[54] FRONT FACE TUBE TO TUBE SHEET WELDING APPARATUS

[76] Inventor: Gasparas Kazlauskas, 10219 Briarwood Dr., Los Angeles, Calif. 90024

[21] Appl. No.: 445,090

[22] Filed: Nov. 29, 1982

[51] Int. Cl.³ .............................................. B23K 9/00
[52] U.S. Cl. ................................ 219/60.2; 219/125.11
[58] Field of Search .............. 219/60.2, 125.11, 60 A, 219/60 R, 137.9

[56] References Cited

U.S. PATENT DOCUMENTS

| | | | |
|---|---|---|---|
| 2,908,805 | 10/1959 | Apblett et al. | 219/60.2 |
| 2,938,106 | 5/1960 | Hawthrone | 219/125.11 |
| 3,159,734 | 12/1964 | Cooksey et al. | 219/125.11 |
| 3,621,182 | 11/1971 | Peyrot | 219/125.11 |
| 3,694,619 | 9/1972 | Nahuijsn et al. | 219/137.9 |
| 3,754,114 | 8/1973 | Peyrot | 219/125.11 |
| 3,754,115 | 8/1973 | Roberts et al. | 219/125.11 |
| 3,806,693 | 4/1974 | Miller | 219/121 EB |
| 4,004,125 | 1/1977 | Hood et al. | 219/125.11 |
| 4,262,187 | 4/1981 | Savor | 219/60.2 X |

*Primary Examiner*—C. L. Albritton
*Assistant Examiner*—Catherine M. Sigda
*Attorney, Agent, or Firm*—Jack C. Munro

[57] ABSTRACT

A tube welding apparatus for the front face of a tube sheet. The welding apparatus includes a welding head housing from which protrudes a securing mandrel assembly. The mandrel assembly is to be positioned within the tube that is to be welded. The securing mandrel assembly includes a ball assembly which is to be movable to an extended position in tight contact with the interior wall of the tube. The welding electrode is to be selectively mountable in any one of various positions within a welding electrode mounting housing which is located within the welding head housing. The different positions of mounting the electrode physically orient the electrode at slightly different angles with respect to the weld area. Inert gas is to be supplied to the weld area through a gas discharge passage assembly. Included within the welding head housing is a gas diffuser to facilitate even dispursement of the gas about the tip of the welding electrode. A fluid cooling passage assembly is located within the welding head housing for the purpose of eliminating excessive heat. Electrical energy for the welding electrode is conducted through a cable which is located within the interior of the fluid cooling supply conduit. An access door is provided within the welding head housing to gain access to the welding electrode to facilitate changing or repositioning of the electrode.

12 Claims, 11 Drawing Figures

FRONT FACE TUBE TO TUBE SHEET WELDING APPARATUS

BACKGROUND OF THE INVENTION

The field of this invention relates to automatic welding apparatuses and more particularly to a welding apparatus which is designed primarily to facilitate welding of tubes to a tube sheet.

A heat exchanger typically consists of a shell in which are located a large number of parallel tubes for carrying cooling liquid. Steam entering the shell condenses on the tubes. At both ends of the heat exchanger, the tubes are held in position by a tube sheet. These spaced apart tube sheets separate the steam containing shell interior from the remaining portion of the heat exchanger.

In a typical heat exchanger, there may be literally hundreds in number of tubes mounted in a closely spaced arrangement within a tube sheet. It is necessary to insure a leakless joint between each tube and the tube sheet. Rolling or expansion of the tubes into the tube sheet does not provide insurance of a leakless joint. Therefore, generally it is desirable that the tubes be welded to the tube sheet.

It has been found that by manual welding of each of the tubes to the tube sheet, insufficient quality is obtained. The inherently repetitive creating of each annular weld results in the production of an occasional poor quality weld. Even if a single tube is found to leak, that leak must be repaired. Therefore, some means must be utilized to achieve a hundred percent weld quality at every weld.

In order to achieve this hundred percent weld quality, it is common to use an automatic welding apparatus. The automatic welding apparatus is securable in a set position with respect to the welding area. Desirable weld quality is obtained through the use of an inert gas environment to the tip of the welding electrode. The welding current and voltage is monitored through the use of a computer and instantaneous changes will be made if preset desirable parameters are not met during the welding procedure.

It has been common in the past to design a type of welding head which mounts directly within the tube that is being welded. This type of mounting utilizes some form of a mandrel assembly which extends within the tube. The mandrel assembly is to include a series of balls or other similar type of structure which is to be biased outwardly into contact with the wall of the tube thereby fixing the welding head in position. However, in the past, it has been found that this securing of the mandrel to the tube has not be sufficiently positive. Usually some form of a biasing spring arrangement is utilized which exerts the desired force to extend the members in contact with the wall surface of the tube. Inherently, a biasing spring arrangement has "give" to it. This "give" permits ever so slight movement of the welding head during the welding operation. This slight movement diminishes weld quality.

Also, prior art tube sheet welding apparatuses utilize one or two gas passages to supply inert gas to the tip of the welding electrode. It has been found that the supply of the inert gas tends to stream, which result in uneven dispersement of the inert gas. This uneven dispersement again diminishes weld quality.

Additionally, the welding temperature that is created is suficiently high which causes the welding head housing to substantially raise in temperature. It is desirable to include some type of heat dissipation structure within the welding head housing in order to eliminate this undesired accumulated heat. An excessively hot welding head housing makes it difficult for the operator to physically grasp the welding head housing and move such from one tube location to another tube location. Such movement is necessary since there is generally hundreds of welds to be completed within a single tube sheet.

SUMMARY OF THE INVENTION

It is a primary object of the present invention to provide a fully automatic welding apparatus for welding tubes to tube sheets which is relatively simple and compact in construction, easy to operate and produces welds of the highest quality.

Another of the present invention is to provide an automatic welding apparatus capable of producing a non-porous, high strength weld between the relatively thin-walled tube and a relatively thick-walled tube sheet.

A tube sheet comprises metal sheet which includes a mass of circular shaped openings formed therein. The openings are normally equidistantly located in respect to each other. The openings are also normally located in horizontal rows and vertical columns. An end of a metallic tube is to be snugly located within each opening and terminated directly adjacent the outer surface of the tube sheet. The end of the tube is to be welded to the tube sheet. This welding is achieved through a welding apparatus which is to be mounted in conjunction with the tube to be welded, and after welding such, the welding apparatus is moved to another tube and the welding procedure repeated. This procedure is repeated until all the tubes mounted within the tube sheet are welded.

The welding apparatus is constructed of a welding head housing within which is located a welding electrode. The welding electrode is mounted on a welding electrode support housing and is rotatable along a circular path with respect to the welding head housing. The rotation of the welding electrode housing is achieved through the use of a motor which operates through appropriate gearing to rotate the welding electrode housing. The welding electrode housing also includes an inert gas passage assembly which is to discharge inert gas directly adjacent the tip of the welding electrode and evenly disperse the gas (thereby completely flooding the area of the weld puddle). An access door is provided within the welding head housing to provide access to the welding electrode to facilitate changing of the welding electrode or for other reasons of access to the welding electrode. The welding electrode is capable of being mounted within the welding electrode housing at a plurality of different positions. Each position orients the welding electrode at a slightly different position with respect to the welding area. Excess heat from the welding head housing is to be removed through a cooling fluid channel assembly. The cooling fluid channel assembly comprises a plurality of side-by-side annular channels located a short distance from the welding area and between the welding area and the rear surface of the welding head housing. The cooling fluid is to be conducted in series through the channels prior to being discharged exteriorly of the welding head housing.

Protruding from the front face of the welding head housing is a securing mandrel assembly which basically takes the shape of an elongated tubular member which is to be inserted in a close fitting manner within the tube that is to be welded. An actuator is mounted in a telescoping manner within the elongated tubular member and is to be movable manually through a positive threaded connection which in turn cams against a ball assembly. The ball assembly is to extend from the exterior surface of the elongated tubular member and into tight contact with the interior wall of the tube that is to be welded. The electrical energy for the welding electrode is supplied through a cable which is mounted within the inlet fluid conduit which connects with the welding head housing and functions to conduct cooling fluid to the cooling passage assembly.

DETAILED DESCRIPTION OF THE SHOWN EMBODIMENT

Figure 1:
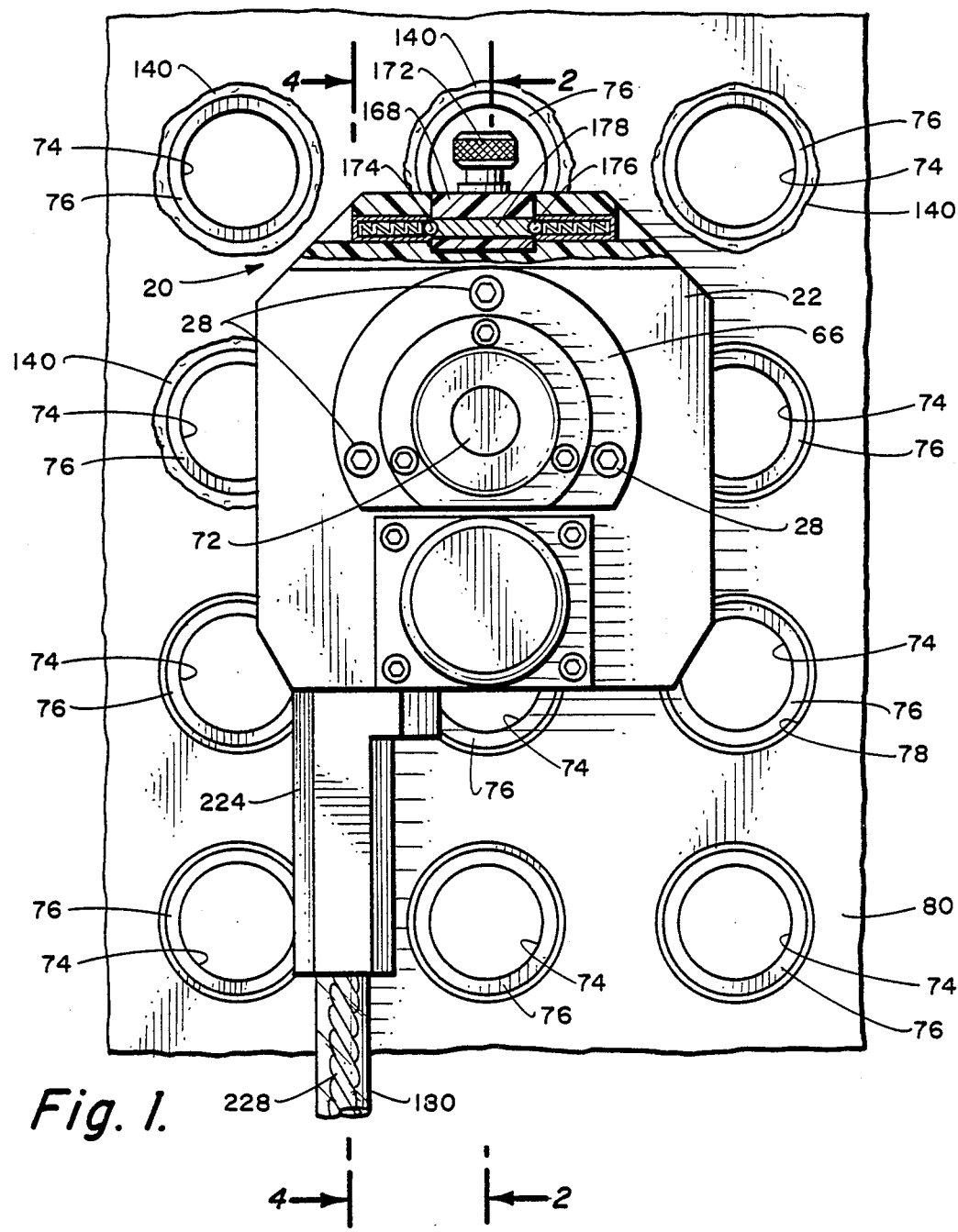
FIG. 1 is a front view of the welding apparatus of this invention showing such mounted in a welding position in conjunction with a tube sheet.
Figure 7:
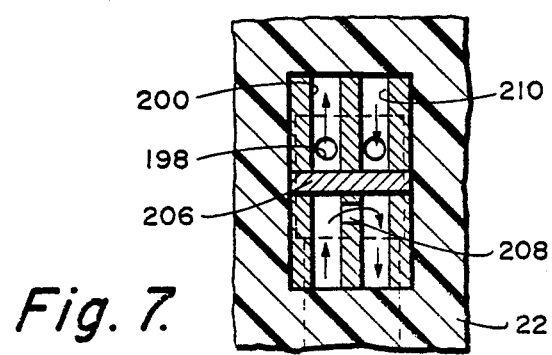
FIG. 7 is a cross-sectional view taken along line 7—7 of FIG. 6 to more clearly describe the flow path of the cooling fluid through the welding head housing.

Referring particularly to the drawings, there is shown the welding apparatus 20 of this invention which includes a welding head housing 22. Within the welding head housing 22 there is a primary internal chamber 24. Also located within the welding head housing 22 is a secondary internal chamber 26. The chambers 24 and 26 are connected together.

Fixedly mounted onto the back face of the welding head housing 22 by means of bolt fasteners 28 is a supporting sleeve 30. Supporting sleeve 30 has an internal elongated chamber 32. Located about the sleeve 30 is a spacing sleeve 34. Spacing sleeve 34 is formed of a plastic material and is designed not to be electrically conductive. Also, the welding head housing 22 is constructed of a plastic material or other non-electrically conductive material. The sleeve 34 is mounted within a centrally located opening 36 located within the welding head housing 22.

The opening 36 extends substantially centrally through the internal chambers 24 and 26. The supporting sleeve 30 is located substantially entirely through the chambers 24 and 26. Threadably secured to the sleeve 30 and protruding out past the front face of the welding head housing 22 is a mandrel member 38. The mandrel member 38 terminates in a pointed outer end 40. Within appropriate openings formed within the wall surface of the member 38 are a first series of balls 42 and a second series of balls 44. The balls 42 are located equidistantly spaced from each other and will normally be three in number. Similarly, the balls 44 are equidistantly spaced from each other and are also three in number. With respect to the longitudinal center axis of the member 38, the balls 44 are spaced longitudinally from the balls 42. The balls 42 and 44 will normally be constructed of a rigid metallic material, such as steel.

The balls 42 connect with an annular groove 46. Similarly, the balls 44 connect with an annular groove 48. The inner side of the annular groove 46 terminates in a cam surface 50. Similarly, the inner side of the annular groove 48 terminates in a cam surface 52. The annular grooves 46 and 48, as well as the cam surfaces 50 and 52 are formed within a shaft 54.

Rotation of the shaft 54 is prevented by set screw 56 which connects within slot 58 formed in the exterior surface of the shaft 54. The set screw 56 passes through the wall of the mandrel member 38. The set screw 56 does permit limited longitudinal movement of the shaft 54 which is determined by the length of the slot 58.

The inner end of the shaft 54 includes an internally threaded opening which in turn is threadingly connected to a jack screw member 60. The jack screw member 60 includes an enlarged flange 62 which fits within an annular groove 64 which is formed within flange plate 66. The bolts 28 connect with the flange plate 66 to bolt such to the welding head housing 22. The flange plate 66 is welded to the supporting sleeve 30. It is to be understood that the internally elongated chamber 32 within the sleeve 30 is of a polygonal configuration. The enlarged section 70 of the shaft 54 is also of a polygonal configuration and is adapted to matingly fit in a close fitting but slidable connection with the internal elongated chamber 32. Exterior withdrawal of the flange 62 of the jack screw member 60 is prevented due to a cover 61 which is fixedly mounted onto plate 66 by means of a fastener assembly 63.

A knob 72 is fixedly mounted onto the jack screw member 60 and is to butt up against the outer surface of the flange 62. Manually turning of the knob 72 results in longitudinal relative movement between the jack screw member 60 and the shaft 54 due to the threaded connection therebetween. As a result, the shaft 54 moves within the mandrel member 38. Inward movement of the shaft 54 will result in the balls 42 coming into contact with the cam surface 50 and the balls 44 coming into contact with cam surface 52. This forces the balls 42 and 44 outward from the exterior surface of the mandrel member 38. The balls 42 and 44 are to come into abutting contact with the inner wall 74 of the tube 76. The tighter the knob 72 is turned, the tighter the balls 42 and 44 are pressed against the inner wall 74. In actual practice, the knob 72 will be tightened rather extensively so that an extremely secure connection is obtained between the mandrel member 38 and the tube 76.

The tube 76 is mounted in a close fitting manner within an appropriate opening 78 formed within a tube sheet 80. It is to be noted that there are a plurality of the tubes 76. Each of the tubes 76 are located within its own respective openings 78. Each of the openings 78 are normally equidistantly spaced apart from each other. Also, each of the tubes 76 are located in a parallel relationship to each other. The inner edge of each tube 76 is to be located substantially flush with the front face 82 of the tube sheet 80.

The welding electrode 84 is removably mounted within an opening 86 which is formed within an electrode mounting housing 88. The housing 88 is constructed of an electrically conductive material. The electrode 84 is fixedly held in position by means of a set screw 90 which is threadably secured within the electrode mounting housing 88. Also included within the electrode mounting housing 88 are other openings 92 and 94 within which the electrode 84 could be located. It is noted that the openings 86, 92 and 94 are equiangularly spaced apart. The openings 85, 92 and 94 are each at a slightly different distance from the longitudinal axis 96. For example, opening 86 could be 0.84 inches from the axis 96, while the opening 92 could be 0.79 inches from the axis 96 and the opening 94 0.81 inches from the axis 96.

Also, the longitudinal center axis of each of the openings 86, 82 and 94 could be at a slightly different inclination in respect to the center axis 96. Generally it is preferred that the angle of inclination should be within the range of twenty to twenty five degrees. The operator then has available a choice as to which opening 86, 92 and 94 to mount the welding electrode 84. The particular opening 86, 92 and 94 that would be selected would be based on the individual welding parameter, such as the exact position of each of the tubes 76 with respect to the tube sheet 80, the material of construction of the tubes 76 and the tube sheet 80, the thickness of the tubes 76 and also the thickness of the tube sheet 80.

In order to achieve maximum weld quality, inert gas must be supplied to the tip of the welding electrode 84. In order to achieve this, there is an annular groove 98 which is to receive inert gas from a passage 100 formed within the welding head housing 22. The passage 100 connects with a connector 102 which in turn connects with a gas supply conduit 104. The gas is to be supplied from a source not shown. A preferable type of inert gas would be nitrogen.

Connecting with the annular groove 98 are four in number of branch passages 106, four in number of branch passages 108 and four in number of branch passages 110. Two in number of the branch passages 106 are located to one side of the opening 86, while the other two in number of the passages 106 are located on the opposite side of the opening 86. This dividing of the passages occurs also with respect to passages 108 having to do with opening 92 and the passages 110 having to do with opening 94. The reason for this division is so as to assist in dispersing of the inert gas to evenly distribute (flood) the tip of the welding electrode 84. Actually, during the welding procedure, a few oxygen molecules can sufficiently affect weld quality so as to produce a poor quality weld. Therefore, it is desirable to provide a complete inert gas environment about the tip of the welding electrode 84.

To further assist in even dispursement of the inert gas about the tip of the welding electrode 84, there is utilized a gas cup 112. The welding electrode 84 protrudes through an opening 114 which is formed within the gas cup 112. Opening 114 is in alignment with the opening 86. The gas cup 112 includes an annular chamber 116 which is located about the mandrel member 38. The annular chamber 116 terminates in a sidewall 118. The function of the sidewall 118 is to confine the inert gas in the area of the welding electrode 84. However, continual flow of the inert gas through the area of the weld is necessary. Therefore, in order to achieve this flow, it is desirable that the inert gas be permitted to escape exteriorly of the gas cup 112. In order to achieve this, the edge of the side wall 118 is slightly spaced from the front face 82 of the tube sheet 80. This inert gas flows through this space and into the ambient.

The gas cup 112 includes a recess 120 formed within a segment of the gas cup 112. The recess 120 forms a wall surface 122. The gas cup 112 is mounted onto the welding electrode supporting housing 88 by means of bolt fasteners 124. When the operator selects the particular opening 86, 92 or 94 within which is to be located the welding electrode 84, the operator then mounts the gas cup 112 so that the electrode 84 connects with the recess 120. As a result, the inert gas which is discharged from the openings 106, 108 or 110 will discharge the gas directly into the wall surface 122. This wall surface 122 functions to further disperse the gas to achieve even distribution. It is to be noted that whatever group of openings 106, 108 or 110 connect with the recess 120, that the openings which do not connect with the recess 120 are closed by the remaining portion of the gas cup 112. In other words, inert gas is to be discharged only from the openings that are located directly adjacent the welding electrode 84.

Located about the gas cup 112 is a cover 126. The cover 126 is to be constructed of a material which is non-electrically conductive and is capable of withstanding high heat. A typical desirable material would be a glass phenolic. The cover 126 includes an annular channel 128. Within the annular channel 128 is located a U-shaped pressure ring 130. Confined within the interior of the pressure ring 130 is a compression spring assembly 132. The function of the compression spring 132 will be explained further on in the specification.

Fixedly mounted by threaded fasteners 134 to the cover 126 is a spacer ring 136. The spacer ring 136 includes a plurality of protuberances (actually six in number) 138 which are located in a circular pattern and concentric about the axis 96. The protuberances 138 are to contact the front face 82 of the tube sheet 80. The spacing between the protuberances 138 provides an exit for the inert gas to escape into the ambient. The height of the protuberances 138 are such as to correctly space the side wall 118 from the front face 82.

The welding electrode 84, as well as the welding electrode supporting housing 88, is to be rotated about the mandrel 38 in order to produce the weld bead 140. A ring gear 142 is fixedly mounted onto the welding electrode housing 88. A pinion gear 144 connects with the ring gear 142. The pinion gear 144 is mounted on shaft 146. The shaft 146 is low frictionally mounted for rotational movement by bearing assemblies 148 and 150 which are in turn mounted within a sleeve 152. The inner end of the shaft 146 is fixed by set screw 154 to a connector block 156. Connector block 156 is to be constructed of a non-electrically conductive material. Connector block 156 is, in turn, fixed by pin 158 to a motor shaft 160. The shaft 160 is to be rotatably driven by a motor 162. The motor 162 includes a motor housing which is mounted by bolts 164 onto the welding head housing 22. It is to be understood that the motor 162 will be electrically driven from a source not shown. The motor housing is covered by a protective cover 166.

Figure 2:
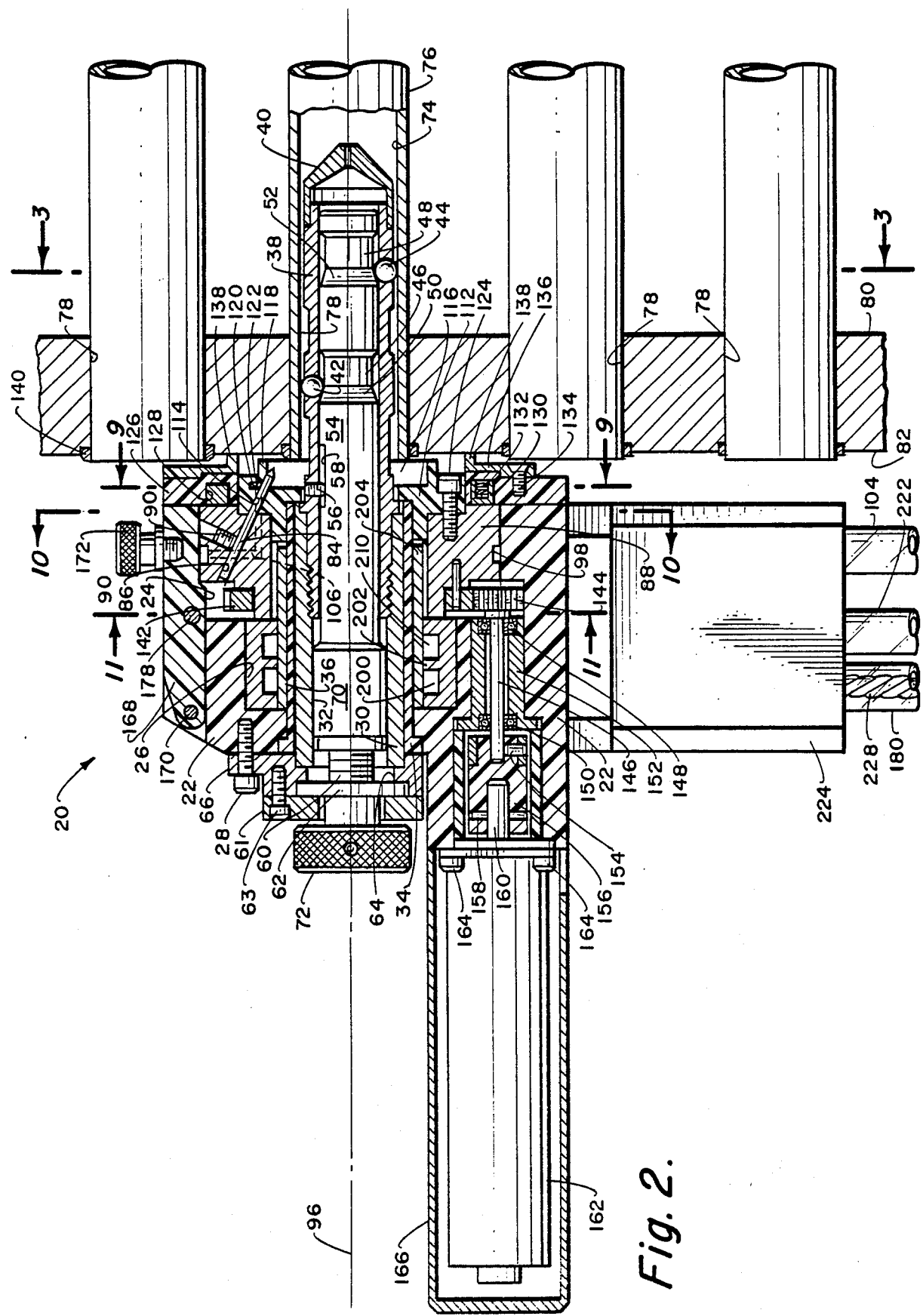
FIG. 2 is a cross-sectional view taken along line 2—2 of FIG. 1 showing the welding apparatus in a fixedly secured position for the purpose of welding a tube to the tube sheet.
Figure 3:
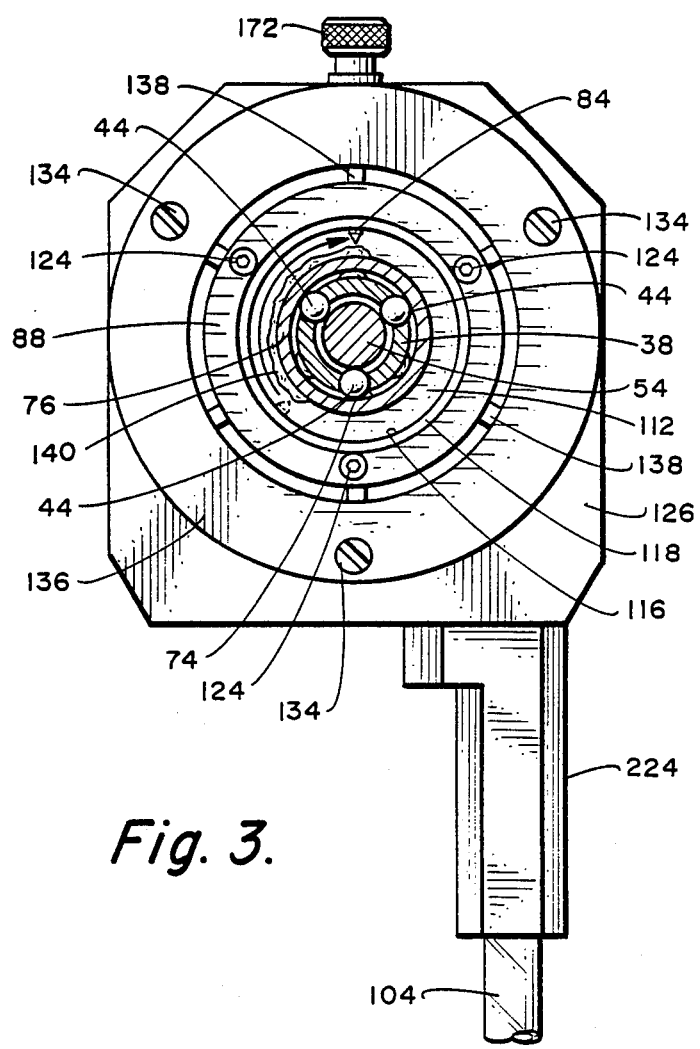
FIG. 3 is a cross-sectional view taken along line 3—3 of FIG. 2 showing in more detail the securing mandrel which fixes in position the welding head in conjunction to the tube to be welded.
Figure 11:
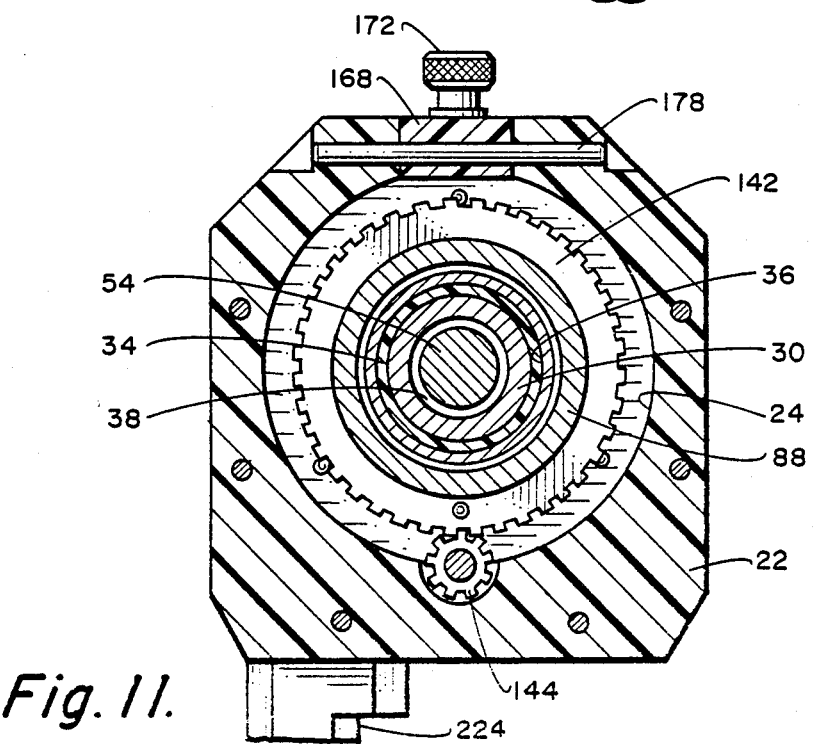
FIG. 11 is a cross-sectional view taken along line 11—11 of FIG. 2 showing in detail the gear arrangement for the transmitting of power to rotate the welding electrode mounting housing in respect to the welding head housing.
Figure 4:
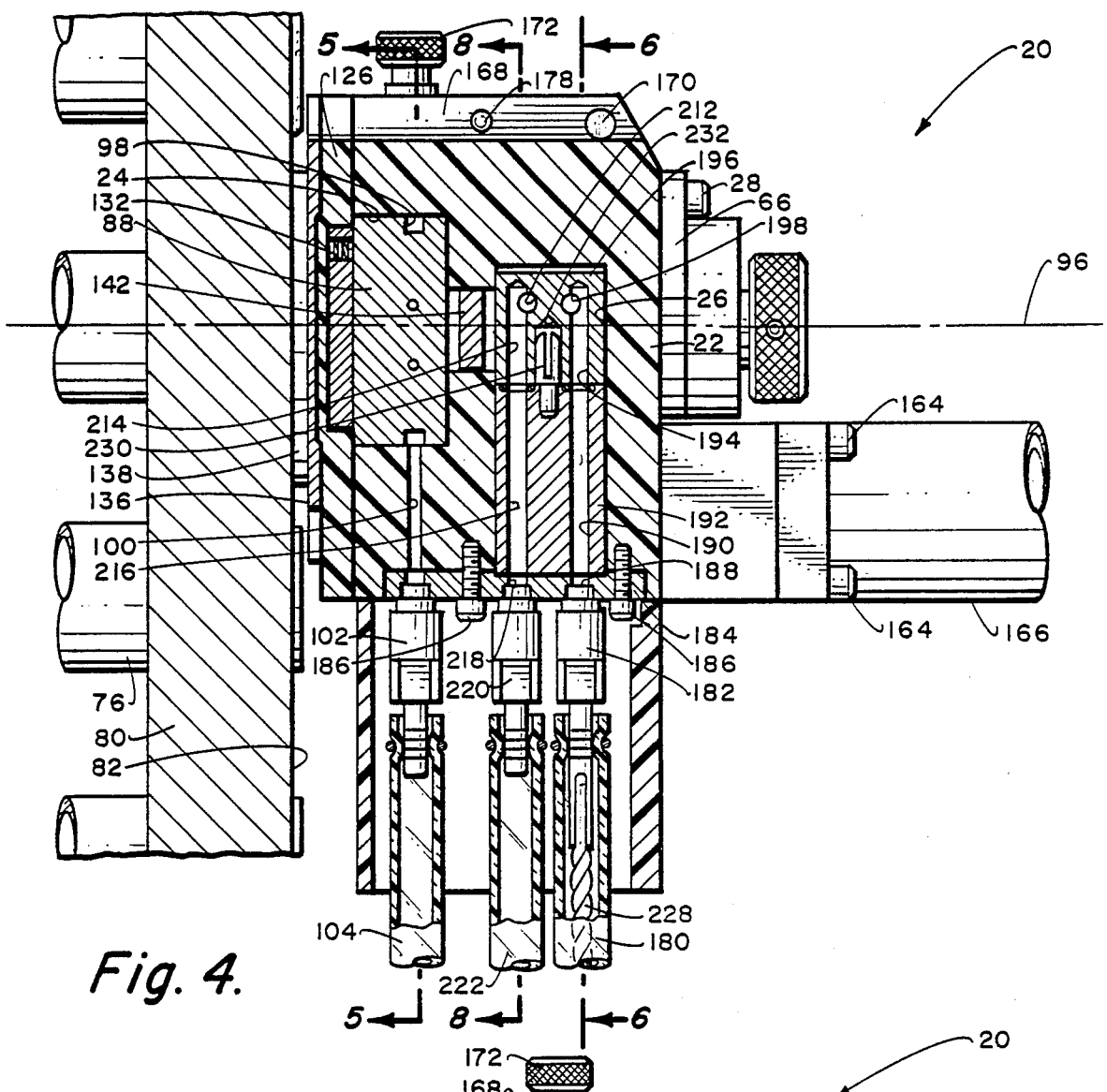
FIG. 4 is a cross-sectional view taken along line 4—4 of FIG. 1 showing in more detail the passage arrangement for the supplying of inert gas and cooling fluid to the welding head housing.
Figure 5:
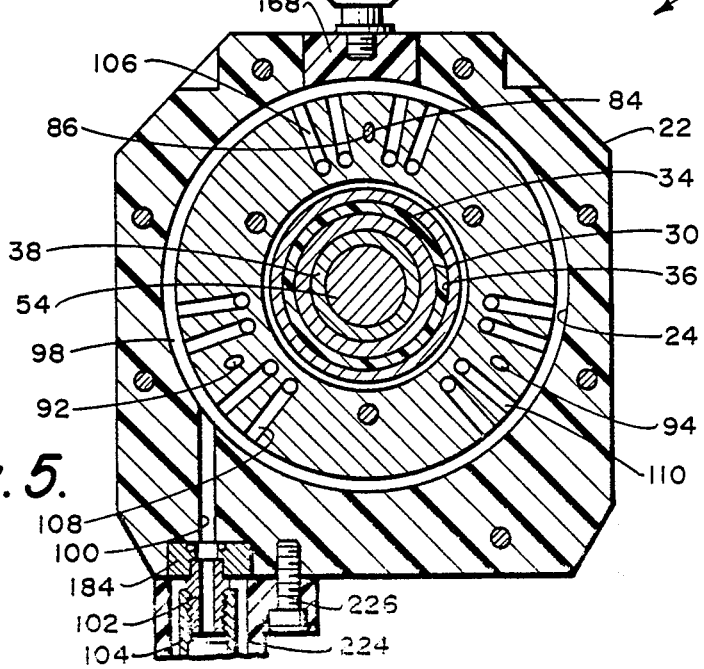
FIG. 5 is a cross-sectional view taken along line 5—5 of FIG. 4 showing in more detail the welding electrode mounting housing located in conjunction within the welding head housing.
Figure 6:
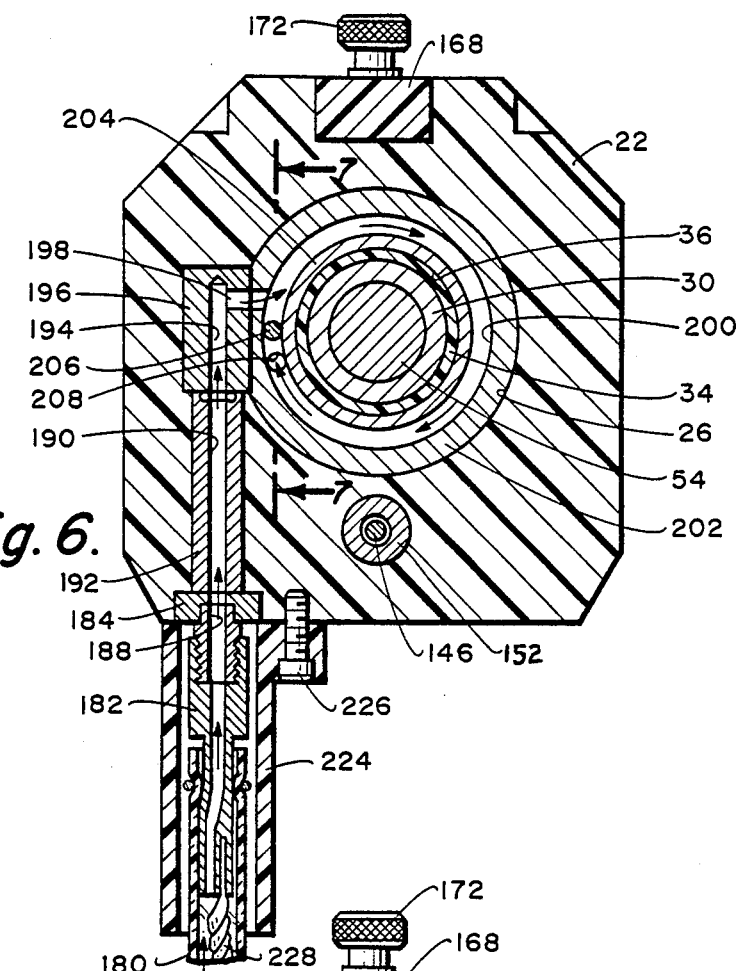
FIG. 6 is a cross-sectional view taken along line 6—6 of FIG. 4 showing in more detail the supplying of cooling fluid to the welding head housing.
Figure 8:
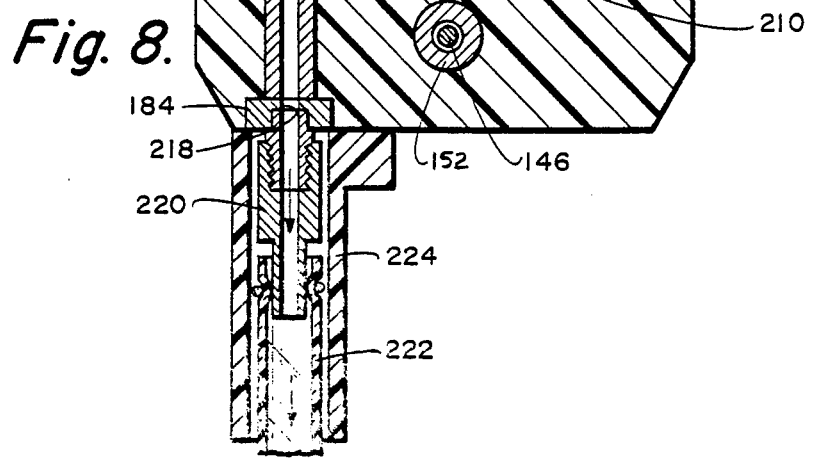
FIG. 8 is a cross-sectional view taken along line 8—8 of FIG. 4 showing in further detail the flow path of the cooling fluid from the welding head housing.
Figure 9:
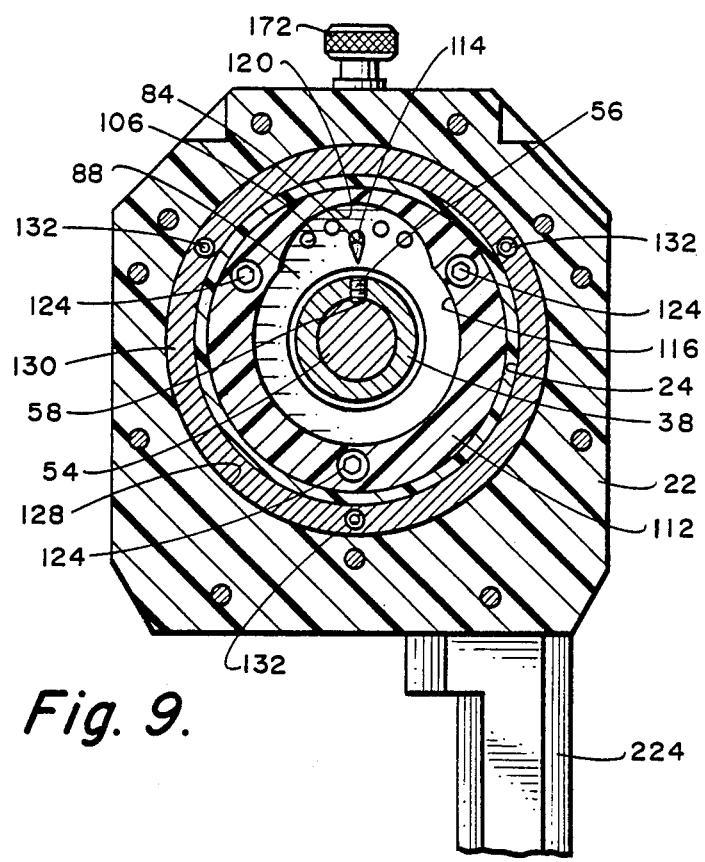
FIG. 9 is a cross-sectional view taken along line 9—9 of FIG. 2 showing the inert gas defusing structure associated in conjunction with the welding electrode.
Figure 10:
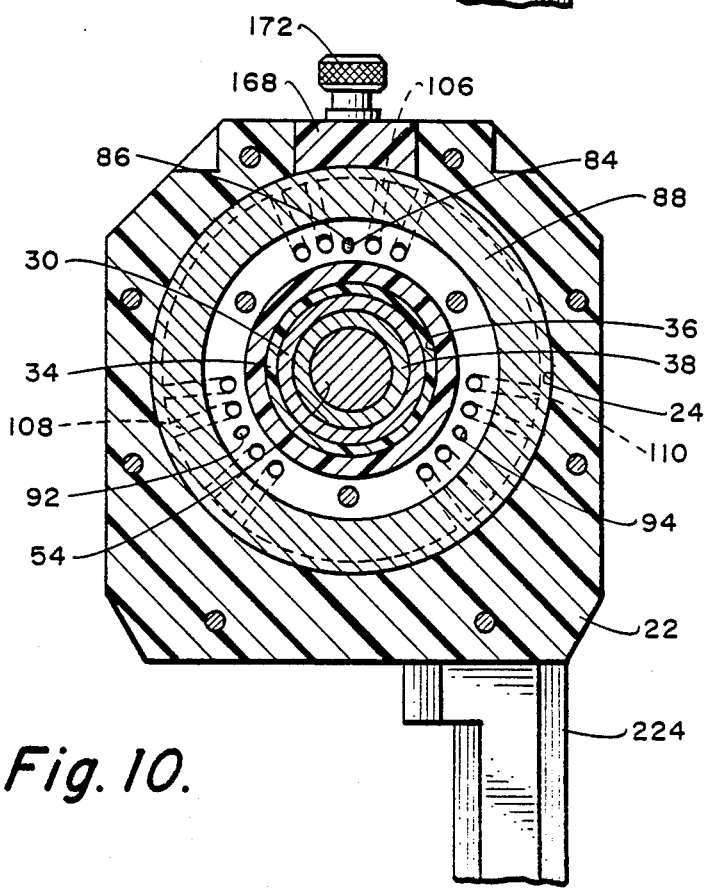
FIG. 10 is a cross-sectional view taken along line 10—10 of FIG. 2 showing in detail the welding electrode mounting housing.

Access into the primary internal chamber 24 is necessary in order to facilitate removal and changing of the welding electrode 84. This access is provided through a door 168. The door 168 is hinged by a pin 170 to the welding head housing 22. The door 168 is to be movable between the closed position shown in FIG. 2 to an open position by manually grasping of knob 172 which is fixedly mounted onto the door 168. The door 168 is held in the closed position by means of spring biased balls 174 and 176 which are mounted within the welding head housing 22. Each of the balls 174 and 176 is to connect with a recess formed within an end of a pin 178. The pin 178 is fixedly mounted within the door 168.

It is desirable to remove excess heat that is created within the welding head housing 22. In order to achieve this, a cooling fluid, such as water, is to be conducted through cooling fluid inlet conduit 180. The conduit 180 connects with a fitting 182 which is mounted upon a plate 184. The plate 184 is fixedly mounted by bolts 186 onto the welding head housing 22. It is to be noted that the fitting 102 is also fixedly mounted onto the plate 184.

The cooling fluid is conducted from the fitting 180 through a passage 188 formed within the plate 184 to within a passage 190 formed within a copper housing 192. The cooling fluid from the passage 190 is conducted into passage 194 formed within a copper manifold 196. The cooling fluid is conducted from the manifold 196 through passage 198 into circular shaped cooling channel 200. The cooling channel 200 is formed within ring 202 which is mounted within the welding head housing 22. The inside surfaces of the cooling channel 200 is closed by means of sleeve 204 which is mounted about supporting sleeve 30.

Extending across the cooling channel 200 and closing such directly adjacent the passage 198 is a pin 206. Pin 206 is located so that cooling fluid upon entering the cooling channel 200 must traverse the substantially three hundred and sixty degrees of the channel 200 before being discharged through connecting passage 208 formed within the ring 202. Cooling fluid then flows into a second cooling channel 210 and again due to the location of the pin 206, the fluid must move almost three hundred and sixty degrees about the channel 210 until it can be discharged through passage 212 into passage 214 formed within manifold 196. The cooling fluid is then conducted from passage 214 into passage 216 formed within copper housing 192. From passage 216, the cooling fluid is conducted through passage 218 formed within the plate 184 and through the fitting 220 into conduit 222. From the conduit 222, the cooling fluid would be conducted to an appropriate reservoir (not shown) which would permit cooling of the fluid prior to being reconducted into the inlet conduit 180.

It is to be noted that each of the fittings 102, 198 and 220 are covered by a protective cover 224 which is connected by bolt fasteners 226 to the welding head housing 22.

In order to obtain a positive electrical conducting path to the welding electrode 84, the welding current is conducted through cable 228 which is mounted within the inlet conduit 180. The locating of the cable 228 within the conduit 180 condenses the structural arrangement and also protects the electrical conducting path from being accidentally touched by a human being or a separate outside structure. The cooling fluid which is conducted through the conduit 180 functions as a very satisfactory insulator. The electrical energy is conducted from a source (not shown) to the conductive cable 228.

From the cable 228 the current is conducted through fitting 182, plate 184 into copper housing 192. To insure positive conducting of the current between the housing 192 and the plate 184, the housing 192 is snugly located within a recess formed within the interior surface of the plate 184.

From the housing 192 the current is conducted into manifold 196. Again to insure positive electrical contact between the housing 192 and the manifold 196, a pin 230 is utilized. One end of the pin 230 is mounted within a hole formed within the housing 192, with the other end of the pin 230 being forced within an opening 232 formed within the manifold 196.

The ring 202 includes a flattened section (not shown) at its exterior surface. This flattened section is to be tightly pressed against the manifold 196. Therefore, the welding current is conducted into the ring 202. From the ring 202, the welding current is conducted into the welding electrode mounting housing 88 and hence into the welding electrode 84. The spring 132 exerts a continuous bias against the pressure ring 130 which in turn pushes tightly against welding electrode mounting housing 188. The welding electrode support housing 188 is then pushed tightly against the ring 202. Therefore, a positive electrical connection is continuously assured between the ring 202 and the welding electrode mounting housing 88.

It is to be noted that the spacing sleeve 34 electrically insulates the supporting sleeve 30 from the ring 202. In other words, no part of the mandrel assembly at any time is ever electrically charged. It is also to be noted that the connector block 156 functions to electrically insulate the motor 162 from the welding current. Also, the housing 22, the gas cup 112 and the cover 126 function as electrical insulators.

It is to be noted that the spacing sleeve 34 electrically insulates the supporting sleeve 30 from the ring 202. In other words, no part of the mandrel assembly at any time is ever electrically charged. It is also to be noted that the connector block 156 functions to electrically insulate the motor 162 from the welding current. Also, the housing 22, the gas cup 112 and the cover 126 function as electrical insulators.

In the operation of the welding apparatus 20 of this invention, the operator turns the knob 72 so that the balls 42 and 44 totally connect respectively with the annular grooves 46 and 48. The operator then places the mandrel member 38 within the tube 76 which is desired to be welded to the tube sheet 80. The operator inserts the mandrel 38 until the protuberances 138 rest flush against the front face 82. The operator then turns the knob 72 until the cam surfaces 50 and 52 push the balls 42 and 44, respectively sufficiently outward to be in tight engagement with the inner wall 74 of the tube 76. The operator will actually tighten the knob 72 as much as possible so that an extremely secure mounting is obtained between the mandrel 38 and the tube 76. The welding apparatus 20 is then activated which entails the activating of the motor 62 to rotate the welding electrode supporting housing 88, the supplying of the welding current to the welding electrode 84 and the conducting of cooling fluid through the channels 200 and 210. Also, insert gas is to be supplied to the tip of the welding electrode 84.

Normally, a single weld will require a single pass (three hundred and sixty degree rotation) of the welding electrode supporting housing 88. It is to be understood that the control of the welding apparatus 20 is obtained through the use of a computer assembly (not shown).

What is claimed is:

1. A welding apparatus for welding of a plurality of assembled tubes to the front face of a tube sheet comprising:

a welding head housing having an internal chamber, said welding head housing having a front surface and a rear surface;

a securing mandrel assembly mounted on said welding head housing and protruding from said front surface, a portion of said protruding mandrel assembly to be located within a particular tube that is to be welded to said tube sheet, said protruding mandrel assembly having an exterior wall, a securing member assembly mounted upon said protruding mandrel assembly, said securing member assembly being movable between a retracted position and an extended position, said extended position being when said securing member assembly extends exteriorly of said exterior wall, said retracted position being when said securing member assembly is confined within said protruding mandrel assembly;

an actuator assembly connected to said securing member assembly, said actuator assembly being manually operable to move said securing member assembly between said retracted position and said extended position, with said securing member assembly in said extended position said securing member assembly being physically pressed against the wall of said tube thereby securely fixing in position said welding head housing in respect to said tube sheet; and said securing member assembly comprising a plurality of balls, said actuator assembly comprising a sleeve which is lineally movable within said protruding mandrel assembly, said sleeve including a cam means, said cam means connecting with said balls, movement of said sleeve causes lineal movement of said balls from said retracted position to said extended position, said sleeve being connected to a manually turnable knob, said sleeve being threadably connected to said welding head housing, rotation of said sleeve by manual turning of said knob results in said lineal movement of said sleeve relative to said welding head housing through said threaded connection, selecting the amount of turning of said knob varies the amount of force said balls exert against the wall of said tube so as to assure tight engagement with each and every said tube regardless of slight variations in the diameters of said tubes.

2. The welding apparatus as defined in claim 1 including:

a welding electrode mounting housing mounted within said welding head housing, said welding electrode mounting housing having a plurality of spaced-apart electrode mounting locations, a welding electrode, said welding electrode to be mountable within any one of said electrode mounting locations, each said mounting location orients said welding electrode at a slightly different position relative to the welding area.

3. The welding apparatus as defined in claim 2 wherein:

said electrode mounting housing including a plurality of gas passage groups, a said group to be located directly adjacent a said welding electrode location.

4. The welding apparatus as defined in claim 3 wherein:

a gas cup being attached to said welding electrode mounting housing, said gas cup to contact said tube sheet about the welding area, said gas cup including dispersing means, said dispersing means to cause inert gas from said group of gas passages located about said welding electrode to be substantially evenly dispersed about the tip of said welding electrode.

5. The welding apparatus as defined in claim 2 wherein:

said welding head housing including an access door, said access door providing access to said welding electrode.

6. The welding apparatus as defined in claim 1 wherein:

a fluid cooling passage assembly located within said welding head housing, said fluid cooling passage assembly including a plurality of annular fluid conducting chambers, cooling fluid is to flow sequentially through said chambers.

7. The welding apparatus as defined in claim 6 wherein:

an inlet cooling fluid supply conduit connected to said welding head housing, said cooling fluid supply conduit to supply cooling fluid into said annular fluid conducting chambers, an electrical conducting cable connected to said welding head housing, said electrical conducting cable to supply electrical energy to said welding electrode, said electrical conducting cable being conducted through said cooling fluid supply conduit.

8. A welding apparatus for welding of a plurality of tubes to a tube sheet comprising:

a welding head housing having an internal chamber, said welding head housing having a front surface and a rear surface, a gas cup located at said front surface capable of contacting said tube sheet about the welding area, a welding electrode being mounted directly adjacent said gas cup, said welding electrode being mounted within a welding electrode mounting housing, said welding electrode mounting housing including an inert gas passage assembly, said gas cup including gas diffusing means for evenly dispersing inert gas about the tip of said welding electrode;

said diffusing means comprising a groove forming a walled surface directly adjacent the tip of said electrode, said inert gas passages being located to direct the flow of the inert gas directly into said walled surface thereby preventing the inert gas from forming streams and thereby being evenly disbursed by making the flow of the inert gas turbulent; and said welding electrode mounting housing including a plurality of separate welding electrode locations, each said welding electrode location to position the welding electrode slightly differently in respect to the welding area.

9. The welding apparatus as defined in claim 8 wherein:

said welding head housing including an access door, said access door providing access to said welding electrode.

10. The welding apparatus as defined in claim 8 wherein:

said welding electrode mounting housing including a plurality of groups of gas passages, a said group to be located directly adjacent a said welding electrode location.

11. The welding apparatus as defined in claim 8 wherein:

a fluid cooling passage assembly located within said welding head housing, said fluid cooling passage assembly including a plurality of annular fluid conducting chambers, cooling fluid is to flow sequentially through said chambers.

12. The welding apparatus as defined in claim 11 wherein:

an inlet cooling fluid supply conduit connected to said welding head housing, said cooling fluid supply conduit to supply cooling fluid into said annular fluid conducting chambers, an electrical conducting cable connected to said welding head housing, said electrical conducting cable to supply electrical energy to said welding electrode, said electrical conducting cable being conducted through said cooling fluid supply conduit.

* * * * *